US012007478B2

(12) United States Patent
Koshida et al.

(10) Patent No.: US 12,007,478 B2
(45) Date of Patent: Jun. 11, 2024

(54) DISTANCE MEASURING DEVICE, DISTANCE MEASURING SYSTEM, DISTANCE MEASURING METHOD, AND PROGRAM

(71) Applicant: PANASONIC INTELLECTUAL PROPERTY MANAGEMENT CO., LTD., Osaka (JP)

(72) Inventors: Hiroshi Koshida, Osaka (JP); Shinzo Koyama, Osaka (JP); Motonori Ishii, Osaka (JP); Shigetaka Kasuga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 937 days.

(21) Appl. No.: 16/982,405

(22) PCT Filed: Mar. 14, 2019

(86) PCT No.: PCT/JP2019/010699
§ 371 (c)(1),
(2) Date: Sep. 18, 2020

(87) PCT Pub. No.: WO2019/188374
PCT Pub. Date: Oct. 3, 2019

(65) Prior Publication Data
US 2021/0072380 A1    Mar. 11, 2021

(30) Foreign Application Priority Data
Mar. 26, 2018   (JP) .................................. 2018-058731

(51) Int. Cl.
G01C 3/08       (2006.01)
G01S 7/481      (2006.01)
(Continued)

(52) U.S. Cl.
CPC ............ *G01S 17/10* (2013.01); *G01S 7/4816* (2013.01); *G01S 7/4865* (2013.01); *G01S 17/89* (2013.01)

(58) Field of Classification Search
CPC ....... G01S 17/10; G01S 7/4816; G01S 7/4865
See application file for complete search history.

(56) References Cited

U.S. PATENT DOCUMENTS

2001/0046317 A1   11/2001   Kamon et al.
2006/0126054 A1    6/2006   Kamon et al.
(Continued)

FOREIGN PATENT DOCUMENTS

JP    2001-337166 A    12/2001
JP    2009-079988 A     4/2009
(Continued)

OTHER PUBLICATIONS

International Search Report and Written Opinion issued International Patent Application No. PCT/JP2019/010699, dated May 21, 2019; with partial English translation.

*Primary Examiner* — Mark Hellner
(74) *Attorney, Agent, or Firm* — Rimon P.C.

(57) ABSTRACT

A distance measuring device is to be connected to a wave transmission module to transmit a measuring wave and a wave reception module including a first wave receiver and a second wave receiver, both of which receive the measuring wave reflected from a target. In this distance measuring device, a first wave reception period in which the first wave receiver receives the measuring wave and a second wave reception period in which the second wave receiver receives the measuring wave overlap with each other on a time axis. In addition, in this distance measuring device, a time lag is provided between respective beginning times of the first and second wave reception periods. The time lag is shorter than (Continued)

either the first wave reception period or the second wave reception period.

9 Claims, 8 Drawing Sheets

(51) Int. Cl.
 *G01S 7/4865* (2020.01)
 *G01S 17/10* (2020.01)
 *G01S 17/89* (2020.01)

(56) References Cited

U.S. PATENT DOCUMENTS

| | | |
|---|---|---|
| 2016/0290790 A1 | 10/2016 | Wu |
| 2017/0052065 A1 | 2/2017 | Sharma et al. |
| 2017/0064235 A1 | 3/2017 | Wang et al. |
| 2018/0143007 A1 | 5/2018 | Wu |
| 2019/0033450 A1* | 1/2019 | Shan ................... G01S 17/10 |
| 2019/0056498 A1* | 2/2019 | Sonn ................... G01S 17/931 |

FOREIGN PATENT DOCUMENTS

| | | | |
|---|---|---|---|
| JP | 2010-197118 A | 9/2010 | |
| JP | 2011-013138 A | 1/2011 | |
| JP | 2011-022089 A | 2/2011 | |
| JP | 2013-076645 A | 4/2013 | |
| WO | 2016/160117 A1 | 10/2016 | |
| WO | WO 2017149370 A1 * | 9/2017 | ............. G01S 17/18 |

* cited by examiner

DISTANCE MEASURING DEVICE, DISTANCE MEASURING SYSTEM, DISTANCE MEASURING METHOD, AND PROGRAM

CROSS-REFERENCE OF RELATED APPLICATIONS

This application is the U.S. National Phase under 35 U.S.C. § 371 of International Patent Application No. PCT/JP2019/010699, filed on Mar. 14, 2019, which in turn claims the benefit of Japanese Application No. 2018-058731, filed on Mar. 26, 2018, the entire disclosures of which Applications are incorporated by reference herein.

TECHNICAL FIELD

The present disclosure generally relates to a distance measuring device, a distance measuring system, a distance measuring method, and a program, and more particularly relates to a distance measuring device, a distance measuring system, a distance measuring method, and a program, all of which are configured or designed to measure the distance to a target.

BACKGROUND ART

A three-dimensional input device (distance measuring system) for measuring distances to a plurality of points on a target object by projecting light toward the target object and receiving the light reflected from the target object has been known in the art (see, for example, Patent Literature 1).

The three-dimensional input device of Patent Literature 1 includes a light transmission means, an image capturing area sensor, and a controller. The light transmission means projects pulses of light toward the target object. The image capturing area sensor includes a plurality of photoelectric transducers for receiving the light reflected from the target object. The controller performs exposure control on the image capturing area sensor in sync with the projection of the pulses of light. The three-dimensional input device further includes a means for removing, from an exposure dose obtained by the exposure control, received light intensity variation components that vary according to the distance to the target object or the reflectance of the target object.

There has been an increasing demand for a distance measuring device to measure the distance with even higher resolution.

CITATION LIST

Patent Literature

Patent Literature 1: JP 2001-337166 A

SUMMARY OF INVENTION

In view of the foregoing background, it is therefore an object of the present disclosure to provide a distance measuring device, a distance measuring system, a distance measuring method, and a program, all of which contribute to increasing the resolution of the distance measured.

A distance measuring device according to an aspect of the present disclosure is to be connected to a wave transmission module to transmit a measuring wave and a wave reception module including a first wave receiver and a second wave receiver, both of which receive the measuring wave that has been reflected from a target. In this distance measuring device, a first wave reception period in which the first wave receiver receives the measuring wave and a second wave reception period in which the second wave receiver receives the measuring wave overlap with each other on a time axis. A time lag is provided between a beginning time of the first wave reception period and a beginning time of the second wave reception period. The time lag is shorter than either the first wave reception period or the second wave reception period.

A distance measuring device according to another aspect of the present disclosure is to be connected to a wave transmission module to transmit a measuring wave and a wave reception module including a plurality of wave receivers to receive the measuring wave that has been reflected from a target. In this distance measuring device, respective wave reception periods in which the plurality of wave receivers receive the measuring wave overlap with each other on a time axis. A time lag is provided between respective beginning times of the wave reception periods. The time lag is shorter than each of the plurality of wave reception periods.

A distance measuring system according to still another aspect of the present disclosure includes: the distance measuring device described above; the wave transmission module; and the wave reception module.

A distance measuring method according to yet another aspect of the present disclosure is a method for measuring a distance to a target based on a time interval between transmission of a measuring wave from a wave transmission module and reception of the measuring wave, reflected from the target, at a plurality of wave receivers of a wave reception module. The distance measuring method includes controlling a plurality of wave reception periods, in which the plurality of wave receivers receives the measuring wave, on an individual basis with respect to each of the plurality of wave receivers. The distance measuring method further includes shifting respective beginning times of the plurality of wave reception periods by a time lag which is shorter than each of the plurality of wave reception periods.

A program according to yet another aspect of the present disclosure is designed to cause a computer system to execute the distance measuring method described above.

DESCRIPTION OF EMBODIMENTS

Note that embodiments and their variations to be described below are only examples of the present disclosure and should not be construed as limiting. Rather, those embodiments and variations may be readily modified in various manners depending on a design choice or any other factor without departing from a true spirit and scope of the present disclosure.

(1) Overview

Figure 1:
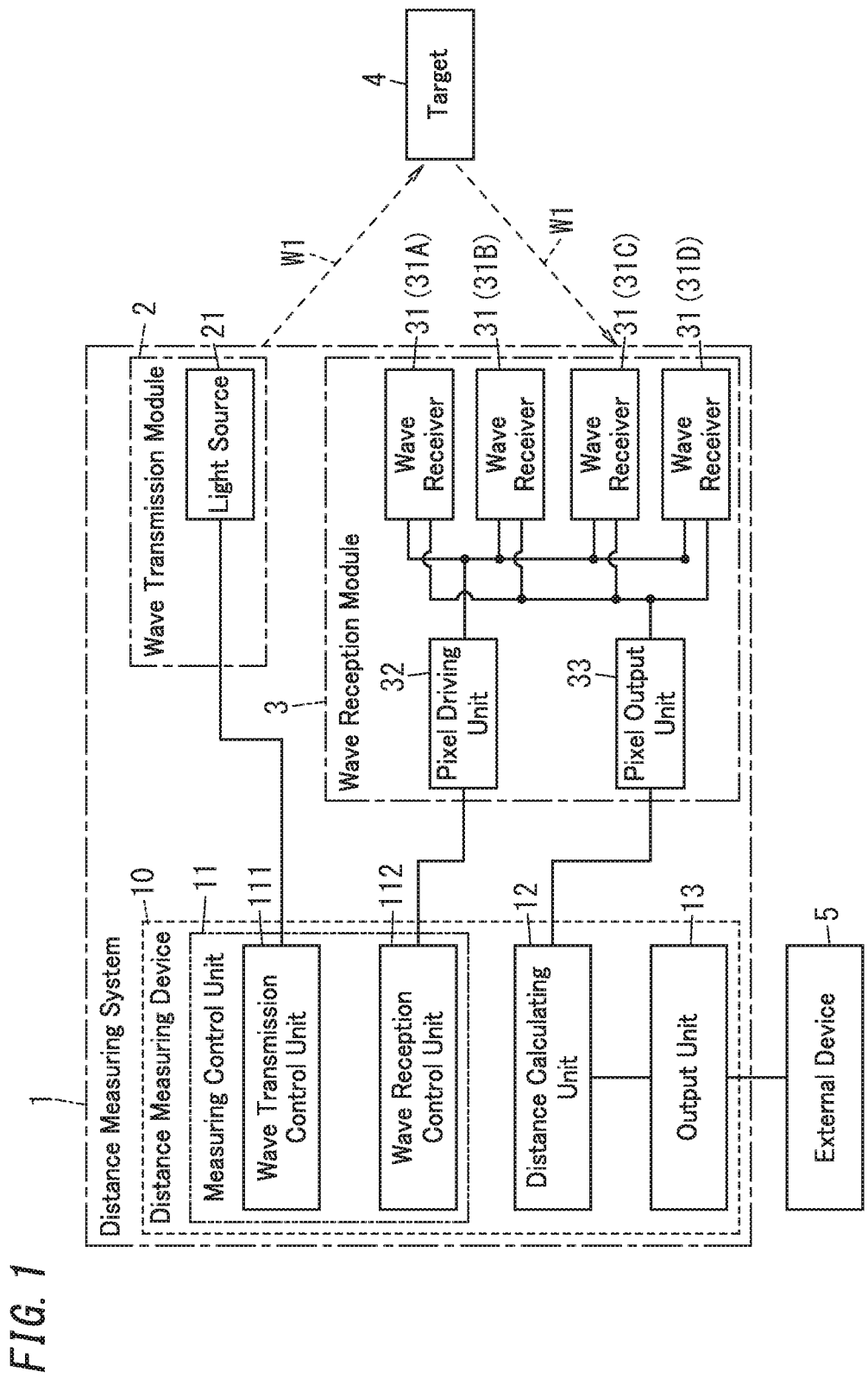
FIG. 1 is a block diagram illustrating a distance measuring system including a distance measuring device according to an exemplary embodiment of the present disclosure.

FIG. 1 is a block diagram illustrating a distance measuring device 10 and a distance measuring system 1 according to an exemplary embodiment.

The distance measuring system 1 includes a distance measuring device 10, a wave transmission module 2, and a wave reception module 3, and measures the distance to a target 4 by the time of flight (TOF) technique. The distance measuring system 1 is applicable for use in, for example, an object recognition system used as a piece of onboard equipment for cars to detect an obstacle, and a surveillance camera and a security camera for detecting an object (or a human).

The wave transmission module 2 is configured to transmit a measuring wave W1 intermittently. The wave reception module 3 includes a plurality of wave receivers 31 to receive the measuring wave W1 that has been reflected from the target 4. The distance measuring device 10 is connected to the wave transmission module 2 and the wave reception module 3 and includes a wave reception control unit 112. The wave reception control unit 112 controls the plurality of wave reception periods in which the plurality of wave receivers 31 receive the measuring wave W1 on an individual basis with respect to each of the plurality of wave receivers 31. In a measuring period that is a time interval between the start of transmission of the measuring wave W1 from the wave transmission module 2 and the start of transmission of the next measuring wave W1 from the wave transmission module 2, the wave reception control unit 112 shifts the respective beginning times of the plurality of wave reception periods by a time lag shorter than each of the plurality of wave reception periods.

In the distance measuring device 10 and distance measuring system 1 according to this embodiment, the respective beginning times of the plurality of wave reception periods are shifted from each other. This allows the timing when the measuring wave W1 reflected from the target 4 has arrived at the wave reception module 3 to be detected within the time lag between the respective beginning times of the plurality of wave reception periods. The time lag between the respective beginning times of the plurality of wave reception periods is shorter than each wave reception period. This allows the distance measuring device 10 and distance measuring system 1 according to this embodiment to increase the resolution of the distance measured and improve the measurement precision.

(2) Overall Configuration for Distance Measuring System (2.1) Wave Transmission Module The wave transmission module 2 includes a light source 21 and is configured to emit pulses of light as the measuring wave W1. That is to say, in this embodiment, the measuring wave W1 is light. In FIG. 1, the measuring wave W1 (light) is indicated conceptually by a dashed line. With this regard, when the distance is measured by the TOF technique, the light (measuring wave W1) suitably has a single wavelength, a relatively short pulse width, and a relatively high peak intensity. In addition, considering the use of the distance measuring system 1 (distance measuring device 10) in an urban area, for example, the wavelength of the light (measuring wave W1) suitably falls within the near-infrared wavelength range in which the luminosity factor is low to the human eye and which is less susceptible to ambient light coming from the sun. In this embodiment, the light source 21 is implemented as a laser diode, for example, and emits a pulsed laser beam. The intensity of the pulsed laser beam emitted from the light source 21 satisfies Class 1 or Class 2 of "Safety of Laser Products" standard (JIS C 6802) established in the country of Japan.

The wave transmitter is subjected to wave transmission control by a wave transmission control unit 111 that the distance measuring device 10 includes. The wave transmission control will be described in detail later in the "(2.3.1) Measuring control unit" section.

Note that the light source 21 does not have to be a laser diode but may also be a light-emitting diode (LED), a vertical cavity surface emitting laser (VCSEL) diode, or a halogen lamp, for example. In addition, the light (measuring wave W1) may fall within a wavelength range different from the near infrared wavelength range.

(2.2) Wave Reception Module

The wave reception module 3 includes an image sensor having a plurality of pixels 311 arranged two-dimensionally as a plurality of partial wave receivers and is configured to receive the measuring wave W1 (light), which is a reflected wave (reflected light) that has been sent out from the wave transmitter and then reflected from the target 4. The plurality of pixels 311 are able to receive the incoming light only when exposed to the light. Each pixel 311 (partial wave receiver) may be a photodiode, for example. Each pixel 311 transduces the light received (as the measuring wave W1) into an electrical signal (hereinafter also referred to as a "pixel signal"). The wave reception module 3 further includes a pixel output unit 33 for outputting the pixel signals to the distance measuring device 10. The signal level of each pixel signal has a value representing the amount of the light (measuring wave W1) received by its associated pixel 311 (i.e., the amount of the waves received). Optionally, each pixel 311 (partial wave receiver) may also be implemented as a solid-state image sensor or an avalanche photodiode (APD), for example. When each pixel 311 is implemented as an avalanche photodiode, the signal level of the pixel signal corresponds to the number of pulses (i.e., the number of photons) of the light received by the pixel 311.

The plurality of pixels 311 are grouped into a plurality of (e.g., four in this embodiment) wave receivers 31 (made up of a first wave receiver 31A through a fourth wave receiver 31D). Each wave receiver 31 includes a plurality of pixels 311. When the plurality of pixels 311 need to be distinguished from each other, pixels 311 belonging to the first wave receiver 31A will be hereinafter referred to as "first pixels 311A," pixels belonging to the second wave receiver 31B will be hereinafter referred to as "second pixels 311B," pixels belonging to the third wave receiver 31C will be hereinafter referred to as "third pixels 311C," and pixels belonging to the fourth wave receiver 31D will be hereinafter referred to as "fourth pixels 311D."

Figure 2:
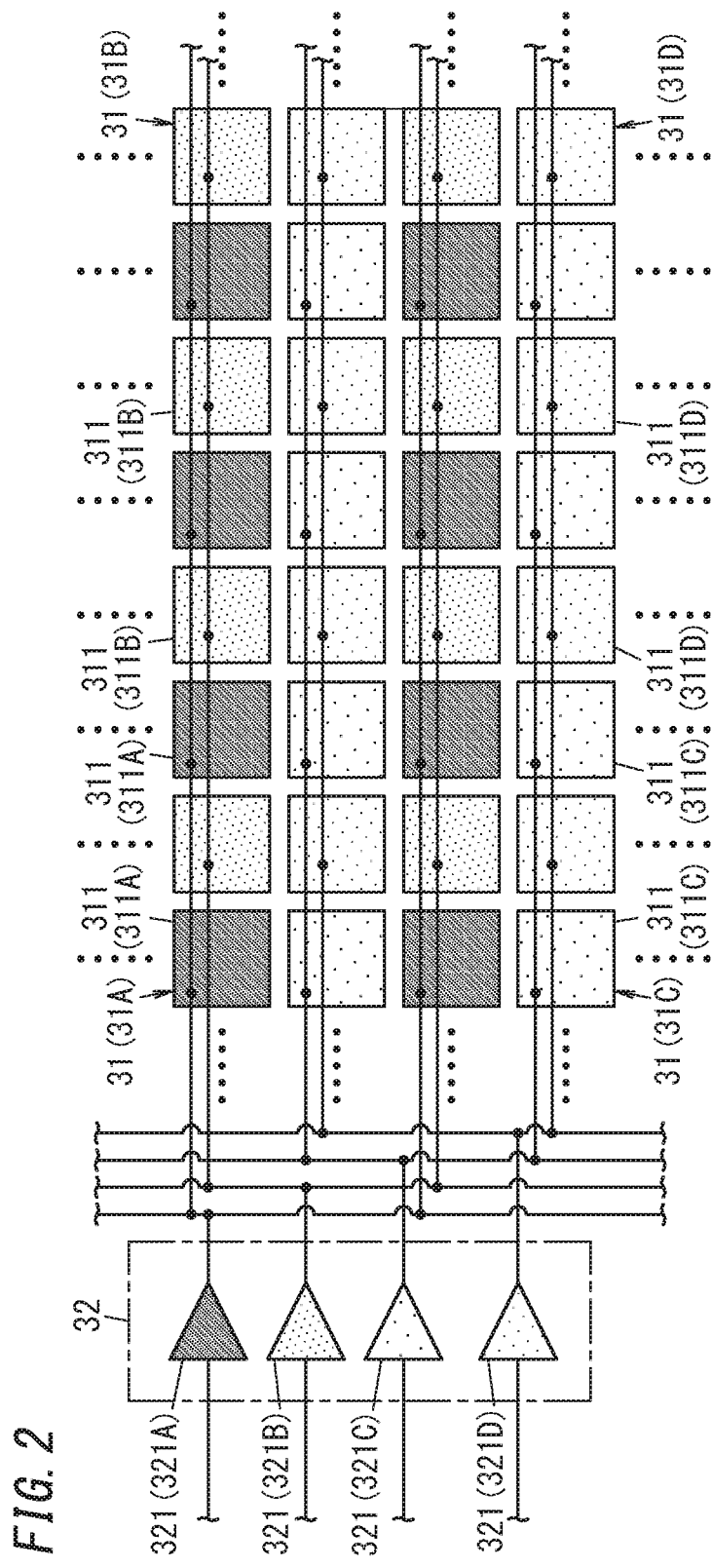
FIG. 2 schematically illustrates an arrangement of pixels in the distance measuring device.

As shown in FIG. 2, the plurality of pixels (namely, the first pixels 311A through the fourth pixels 311D) are arranged uniformly in a first direction (e.g., vertically in FIG. 2) and in a second direction (e.g., horizontally in FIG. 2) perpendicular to the first direction. The plurality of pixels 311 are arranged such that pixels adjacent to each other in the first direction belong to mutually different wave receivers 31 and pixels adjacent to each other in the second direction also belong to mutually different wave receivers 31. In this embodiment, the first pixels 311A and the second pixels 311B are arranged alternately in the second direction, and the third pixels 311C and the fourth pixels 311D are also arranged alternately in the second direction. In addition, the first pixels 311A and the third pixels 311C are arranged alternately in the first direction, and the second pixels 311B and the fourth pixels 311D are also arranged alternately in the first direction.

The size of each pixel 311 is so much smaller than the size of the target 4 imaged that four pixels 311 (consisting of the first through fourth pixels 311A-311D) may be handled as one set. In addition, arranging the plurality of pixels 311 uniformly in the first and second directions contributes to detecting targets 4 in various shapes more accurately.

Each wave receiver 31 turns exposed by being driven by a pixel driving unit 32. The pixel driving unit 32 may drive the plurality of wave receivers 31 and turn the wave receivers 31 exposed on an individual basis. Specifically, the pixel driving unit 32 includes a plurality of gate drivers 321 (namely, first through fourth gate drivers 321A-321D) corresponding one to one to the plurality of wave receivers 31 (see FIG. 2). The first gate driver 321A is electrically connected to the plurality of first pixels 311A belonging to the first wave receiver 31A to turn the first wave receiver 31A (i.e., the plurality of first pixels 311A) exposed. The second gate driver 321B is electrically connected to the plurality of second pixels 311B belonging to the second wave receiver 31B to turn the second wave receiver 31B (i.e., the plurality of second pixels 311B) exposed. The third gate driver 321C is electrically connected to the plurality of third pixels 311C belonging to the third wave receiver 31C to turn the third wave receiver 31C (i.e., the plurality of third pixels 311C) exposed. The fourth gate driver 321D is electrically connected to the plurality of fourth pixels 311D belonging to the fourth wave receiver 31D to turn the fourth wave receiver 31D (i.e., the plurality of fourth pixels 311D) exposed.

The pixel driving unit 32 turns the respective wave receivers 31 exposed in accordance with a control signal from the wave reception control unit 112 that the distance measuring device 10 includes. That is to say, the respective wave receivers 31 are subjected to wave reception control by the wave reception control unit 112. The wave reception control will be described later in the "(2.3.1) Measuring control unit" section.

In addition, since the wave reception module 3 includes an image sensor, the distance measuring system 1 (distance measuring device 10) may generate an image based on the pixel signals to carry out data analysis such as image processing and recognition processing.

(2.3) Distance Measuring Device

The distance measuring device 10 includes a measuring control unit 11, a distance calculating unit 12, and an output unit 13.

(2.3.1) Measuring Control Unit

The measuring control unit 11 is configured to perform wave transmission control on the wave transmission module 2 and wave reception control on (the respective wave receivers 31) of the wave reception module 3. The measuring control unit 11 may be implemented, for example, as a microcomputer including a processor and a memory. That is to say, the measuring control unit 11 may be implemented as a computer system including a processor and a memory. The processor performs the functions of the wave transmission control unit 111 and the wave reception control unit 112 by executing an appropriate program. The program may be stored in advance in the memory or may also be downloaded via a telecommunications line such as the Internet or distributed after having been stored in a non-transitory storage medium such as a memory card. Optionally, the wave transmission control unit 111 and the wave reception control unit 112 may be implemented as two different microcomputers.

When performing the wave transmission control on the wave transmission module 2, the wave transmission control unit 111 controls the timing for the light source 21 to emit light (light emission timing), the pulse width (wave transmission period) of the light emitted from the light source 21, and other parameters.

Meanwhile, when performing the wave reception control on the wave receivers 31, the wave reception control unit 112 controls the timings to turn the plurality of wave receivers 31 exposed (i.e., wave reception timings), the wave reception periods (exposure periods), and other parameters on an individual basis.

Figure 3:
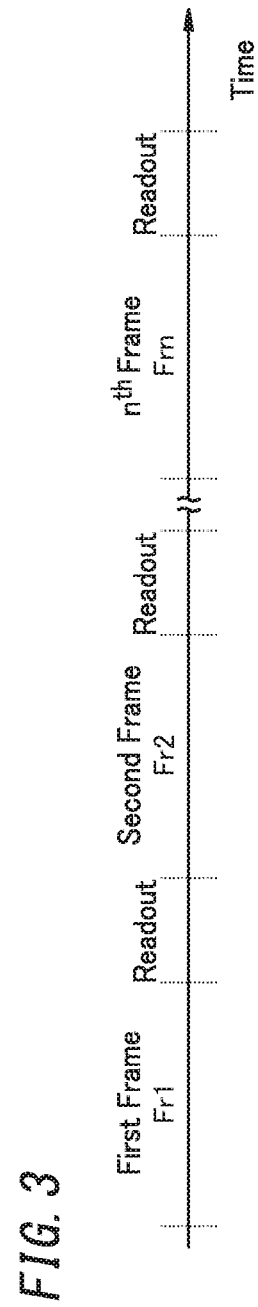
FIG. 3 illustrates how the distance measuring device operates.

Specifically, frames Fr in which the measuring wave W1 is transmitted intermittently alternate with readout periods in which the pixel signals are output (see FIG. 3). In this case, when the plurality of frames Fr need to be distinguished from each other, those frames will be hereinafter sequentially referred to as a first frame Fr1, a second frame Fr2, . . . and an $n^{th}$ frame Frn, beginning with the initial frame Fr. Each frame Fr includes a plurality of measuring periods Tm1. The wave transmission control unit 111 has the measuring wave W1 (light) sent out (emitted) from the wave transmission module 2 at the beginning of each measuring period Tm1. That is to say, the measuring period Tm1 refers herein to a time interval between the start of transmission of a measuring wave W1 from the wave transmission module 2 and the start of transmission of the next measuring wave W1 from the wave transmission module 2. In this embodiment, the plurality of (e.g., four in this embodiment) wave receivers 31 is as many as the plurality of (e.g., four in this embodiment) wave reception periods Tr1 in each measuring period Tm1.

Figure 4:
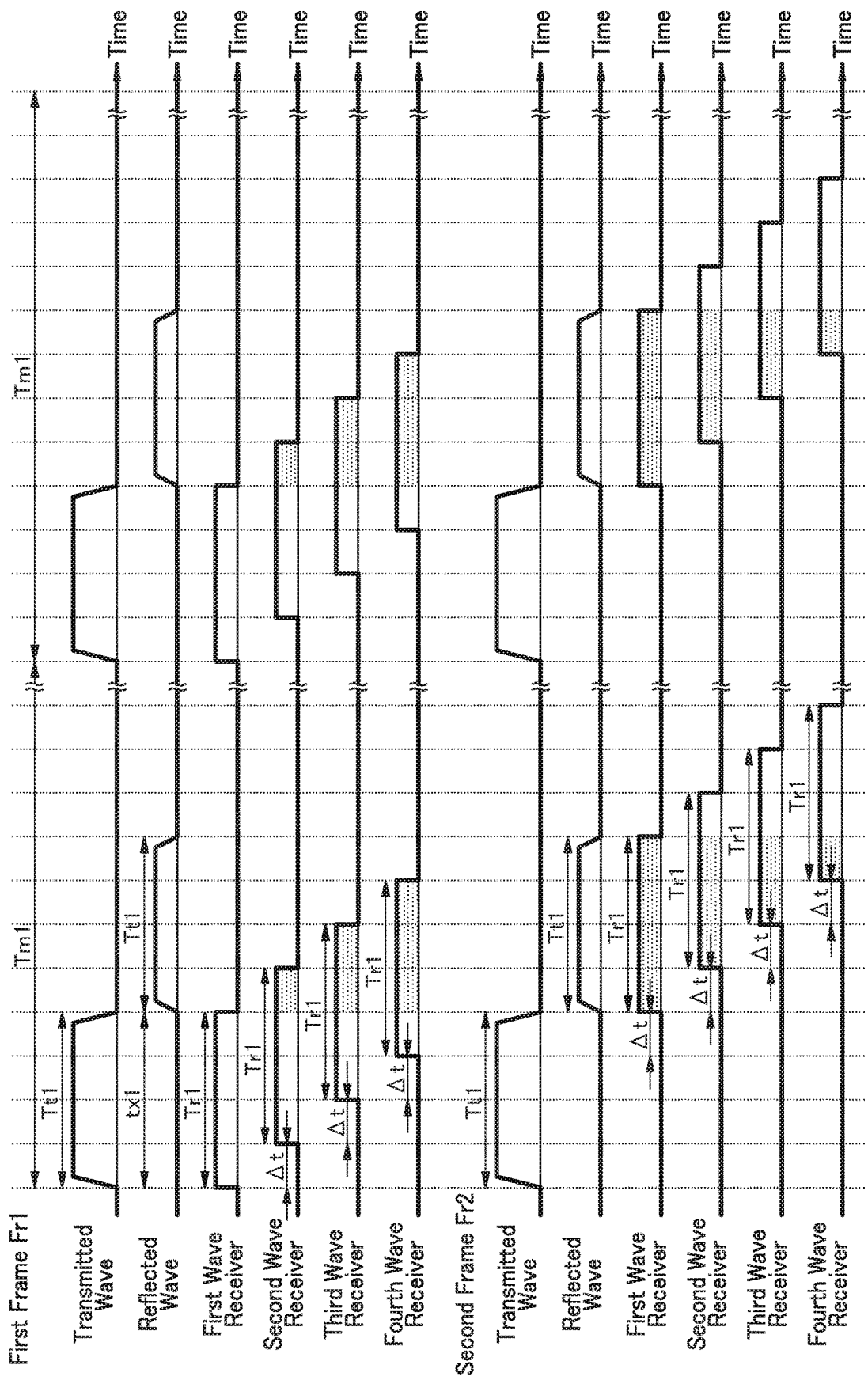
FIG. 4 is a timing diagram illustrating how the distance measuring device operates.

The wave reception control unit 112 sequentially turns the plurality of wave receivers 31 exposed in each measuring period Tm1. The wave reception control unit 112 shifts, in each measuring period Tm1, the respective beginning times of the plurality of wave reception periods Tr1 from each other by a time lag Δt shorter than each wave reception period Tr1. As shown in FIG. 4, in the first frame Fr1, the first wave receiver 31A starts receiving waves (being exposed) at the beginning of each measuring period Tm1. The second wave receiver 31B starts receiving waves (being exposed) after the time lag Δt behind the beginning time of the wave reception period Tr1 of the first wave receiver 31A. The third wave receiver 31C starts receiving waves (being exposed) after the time lag Δt behind the beginning time of the wave reception period Tr1 of the second wave receiver 31B. The fourth wave receiver 31D starts receiving waves (being exposed) after the time lag Δt behind the beginning time of the wave reception period Tr1 of the third wave receiver 31C. The respective wave reception periods Tr1 of the first through fourth wave receivers 31A-31D have the same time length (i.e., the same duration). In addition, in this embodiment, the time length of each wave reception period Tr1 is equal to that of each wave transmission period Tt1. In this embodiment, the time length of the wave reception period Tr1 and wave transmission period Tt1 is equal to the value obtained by multiplying the time lag Δt by four (i.e., the number of the wave receivers 31). For example, the wave transmission period Tt1 and the wave reception period Tr1 may have a time length of 100 ns and the time lag Δt may be 25 ns.

Each wave receiver 31 may receive the wave (light) reflected from the target 4 only during the wave reception period Tr1. The time interval tx1 between the transmission of the measuring wave W1 from the wave transmission module 2 and the reception of the reflected wave at the wave receiver 31 varies according to the distance from the distance measuring system 1 to the target 4. If the distance from the distance measuring system 1 to the target 4 is d and the velocity of light is c, then the time interval tx1 between the transmission of the measuring wave W1 and the reception of the reflected wave is given by 2d/c. That is to say, when the time interval tx1 passes since the transmission of the measuring wave W1, the reflected wave arrives at each wave receiver 31. This allows the distance to the target 4 to be calculated based on the time interval between the transmission of the measuring wave W1 from the wave transmission module 2 and the reception of the reflected wave at the wave reception module 3.

Also, in the same frame Fr, the time lag between the start of transmission of the measuring wave W1 from the wave transmission module 2 and the start of reception at each wave receiver 31 remains the same throughout the respective measuring periods Tm1. Meanwhile, the time lag between the start of transmission of the measuring wave W1 from the wave transmission module 2 and the start of reception at each wave receiver 31 varies from one frame Fr to another. As shown in FIG. 4, in the second frame Fr2 next to the first frame Fr1, each wave receiver 31 starts receiving waves at a timing delayed by the time length of one wave reception period Tr1 with respect to the beginning time of its corresponding wave reception period Tr1 of the same wave receiver 31 in the first frame Fr1. For example, in the second frame Fr2, the start of reception at the first wave receiver 31A is delayed by the time length of one wave reception period Tr1 with respect to the beginning time of the measuring period Tm1. In addition, in the second frame Fr2, the respective beginning times of the plurality of wave reception periods Tr1 are also shifted from each other by the time lag Δt. As can be seen, the start of reception at each wave receiver 31 is shifted with respect to the start of transmission of the measuring wave W1 from the wave transmission module 2 on a frame Fr basis. This allows, no matter at what distance the target 4 is located within the measurable range, the measuring wave W1 reflected from the target 4 to be received.

(2.3.2) Distance Calculating Unit

In a readout period after each frame Fr, the pixel output unit 33 outputs a plurality of pixel signals, representing the results of wave reception at the plurality of wave receivers 31 in the previous frame Fr, to the distance calculating unit 12.

The distance calculating unit 12 is configured to calculate the distance to the target 4 based on the results of wave reception at the plurality of wave receivers 31 (i.e., based on a plurality of pixel signals). The distance calculating unit 12 may be implemented, for example, as a microcomputer including a processor and a memory. That is to say, the distance calculating unit 12 may be implemented as a computer system including a processor and a memory. The processor performs the function of the distance calculating unit 12 by executing an appropriate program. The program may be stored in advance in the memory or may also be downloaded via a telecommunications line such as the Internet or distributed after having been stored in a non-transitory storage medium such as a memory card.

The distance calculating unit 12 determines, by comparing the signal level of each pixel signal with a threshold value, whether or not each wave receiver 31 has received the measuring wave W1 (reflected wave) during the wave reception period Tr1. When finding the signal level of the pixel signal equal to or greater than the threshold value, the distance calculating unit 12 determines that the wave receiver 31 should have received the measuring wave W1. On the other hand, when finding the signal level of the pixel signal less than the threshold value, the distance calculating unit 12 determines that the wave receiver 31 should have received no measuring wave W1. In addition, depending on the decision indicating whether the wave receiver 31 has received the measuring wave W1 or not, the distance calculating unit 12 generates a pixel value encoded as zero or one. Specifically, when finding the signal level of the pixel signal equal to or greater than the threshold value, the distance calculating unit 12 determines that the wave receiver 31 should have received the measuring wave W1 and sets a pixel value corresponding to the pixel signal at one. On the other hand, when finding the signal level of the pixel signal less than the threshold value, the distance calculating unit 12 determines that the wave receiver 31 should have received no measuring wave W1 and sets a pixel value corresponding to the pixel signal at zero. The distance calculating unit 12 sequentially compares the signal levels of the pixel signals of the plurality of wave receivers 31 with the threshold value by beginning with the wave receiver 31 with the earliest beginning time of the wave reception period Tr1, thereby determining whether or not each of the wave receivers 31 has received the measuring wave W1. Thus, according to this embodiment, the distance calculating unit 12 sequentially compares the signal levels of the pixel signals with the threshold value by beginning with the pixel signal of the first wave receiver 31A, determines whether or not each wave receiver 31 has received the measuring wave W1, and generates a pixel value.

In the example illustrated in FIG. 4, the first wave receiver 31A does not receive any measuring wave W1 (reflected wave) during the wave reception period Tr1 of the first frame Fr1, and therefore, a pixel value corresponding to the first wave receiver 31A is zero. Meanwhile, the second to fourth wave receivers 31B-31D each receive the measuring wave W1 (reflected wave) during the wave reception period Tr1, and therefore, a pixel value corresponding to each of the second to fourth wave receivers 31B-31D is one.

In this example, out of the plurality of wave reception periods Tr1 of each measuring period Tm1, a wave reception period Tr1 in which the measuring wave W1 has been received for the first time will be hereinafter referred to as a "post-start-of-wave-reception period." Also, a wave reception period Tr1, which has begun at beginning time earlier by one unit than the beginning time of the post-start-of-wave-reception period, will be hereinafter referred to as a "pre-start-of-wave-reception period." In the example illustrated in FIG. 4, the wave reception period Tr1 of the second wave receiver 31B in the first frame Fr1 is the post-start-of-wave-reception period, and the wave reception period Tr1 of the first wave receiver 31A in the first frame Fr1 is the pre-start-of-wave-reception period.

Thus, as shown in FIG. 4, the reflected wave should have arrived at the wave reception module 3 during the interval between the end time of the pre-start-of-wave-reception period (e.g., the wave reception period Tr1 of the first wave receiver 31A) and the end time of the post-start-of-wave-reception period (e.g., the wave reception period Tr1 of the second wave receiver 31B). This allows the distance to the target 4 to be calculated based on the time interval between the start of transmission of the measuring wave W1 from the wave transmission module 2 (i.e., the beginning time of the measuring period Tm1) and the end of either the pre-start-of-wave-reception period or the post-start-of-wave-reception period.

The distance calculating unit 12 determines, by the pixel value corresponding to each wave receiver 31, at least one of the post-start-of-wave-reception period or the pre-start-of-wave-reception period. Specifically, the distance calculating unit 12 sequentially generates pixel values by beginning with the pixel signal of the first wave receiver 31A. Then, the distance calculating unit 12 determines the wave reception period Tr1 of the wave receiver 31 (e.g., the second wave receiver 31B in FIG. 4) corresponding to the pixel signal, of which the pixel value has just changed from zero to one (i.e., the pixel signal, of which the pixel value has become one for the first time) to be the post-start-of-wave-reception period. In addition, the distance calculating unit 12 also determines the wave reception period Tr1 of the wave receiver 31 (e.g., the first wave receiver 31A in FIG. 4) corresponding to the pixel signal, of which the pixel value is on the verge of changing from zero to one (i.e., the pixel signal, of which the pixel value has become zero for the last time) to be the pre-start-of-wave-reception period. The distance calculating unit 12 calculates, based on the frame Fr corresponding to the pixel signal and the post-start-of-wave-reception period or pre-start-of-wave-reception period determined, the time interval between the start of transmission of the measuring wave W1 from the wave transmission module 2 and the end of either the pre-start-of-wave-reception period or the post-start-of-wave-reception period. Then, the distance calculating unit 12 calculates the distance to the target 4 based on the time interval thus calculated.

As can be seen from the foregoing description, the distance calculating unit 12 calculates the distance to the target 4 based on at least one of the post-start-of-wave-reception period or the pre-start-of-wave-reception period, out of the plurality of wave reception periods Tr1 of the measuring period Tm1. As used herein, the "post-start-of-wave-reception period" refers to a wave reception period Tr1 in which the measuring wave W1 has been received for the first time, out of a plurality of wave reception periods Tr1 of each measuring period Tm1. The "pre-start-of-wave-reception period" herein refers to a wave reception period Tr1, which has begun at a beginning time earlier by one unit than the beginning time of the post-start-of-wave-reception period, out of the plurality of wave reception periods Tr1 of each measuring period Tm1.

Thus, this embodiment allows the distance to the target 4 to be calculated by a unit distance $\Delta l$ ($=\Delta t \times c/2$ (where c is the velocity of light)) based on the time lag $\Delta t$ between the wave reception periods Tr1. For example, if the time lag $\Delta t$ is 25 ns, then the unit distance $\Delta l$ is 3.75 m, thus increasing the resolution of the distance measured, compared to a situation where the wave reception periods Tr1 are shifted from each other so as not to overlap with each other.

(2.3.3) Output Unit

The output unit 13 is configured to output the result of calculation (result of measurement), i.e., the distance to the target 4 as calculated by the distance calculating unit 12, to an external device 5.

Examples of the external device 5 include display devices such as liquid crystal displays and organic electroluminescent (EL) displays. The output unit 13 outputs the result of measurement obtained by the distance calculating unit 12 to the external device 5, thereby making the external device 5 present the result of measurement obtained by the distance calculating unit 12. Alternatively, the output unit 13 may output image data generated based on the pixel signals to the external device 5 to make the external device 5 display the image data. Note that the external device 5 does not have to be a display device but may also be any other type of device.

(3) Distance Measuring Method

The functions of the distance measuring device 10 according to the exemplary embodiment described above may also be implemented as a distance measuring method, a (computer) program, or a non-transitory storage medium that stores the program thereon, for example. The distance measuring method is a method for measuring the distance to the target 4 based on the time interval between the intermittent transmission of the measuring wave W1 from the wave transmission module 2 and the reception of the measuring wave W1, reflected from the target 4, at the plurality of wave receivers 31 of the wave reception module 3. The distance measuring method includes controlling the plurality of wave reception periods Tr1, in which the plurality of wave receivers 31 receive the measuring wave W1, on an individual basis with respect to each of the plurality of wave receivers 31. The distance measuring method also includes shifting respective beginning times of the plurality of wave reception periods Tr1 by a time lag $\Delta t$ which is shorter than each of the plurality of wave reception periods Tr1 in the measuring period Tm1 that is an interval between the end of transmission of the measuring wave W1 from the wave transmission module 2 and the start of transmission of the next measuring wave W1 from the wave transmission module 2.

Also, the program is designed to cause a computer system to carry out the distance measuring method.

The distance measuring device 10 according to the exemplary embodiment described above includes a computer system in its measuring control unit 11 and distance calculating unit 12, for example. In that case, the computer system may include, as principal hardware components, a processor and a memory. The functions of the measuring control unit 11 (including the wave transmission control unit 111 and the wave reception control unit 112) and the distance calculating unit 12 may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation. Optionally, the measuring control unit 11 and the distance calculating unit 12 may be aggregated together on a single chip.

(4) Variations

Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Next, variations of the distance measuring device 10 and distance measuring system 1 according to the exemplary embodiment will be enumerated one after another. Note that the variations to be described below may be adopted in combination as appropriate.

(4.1) First Variation

In the example described above, the distance to the target 4 is calculated based on either the post-start-of-wave-reception period in which the measuring wave W1 has been received for the first time or the pre-start-of-wave-reception period that has begun at a beginning time earlier by one unit than the beginning time of the post-start-of-wave-reception period. However, this is only an example of the present disclosure and should not be construed as limiting.

Figure 5:
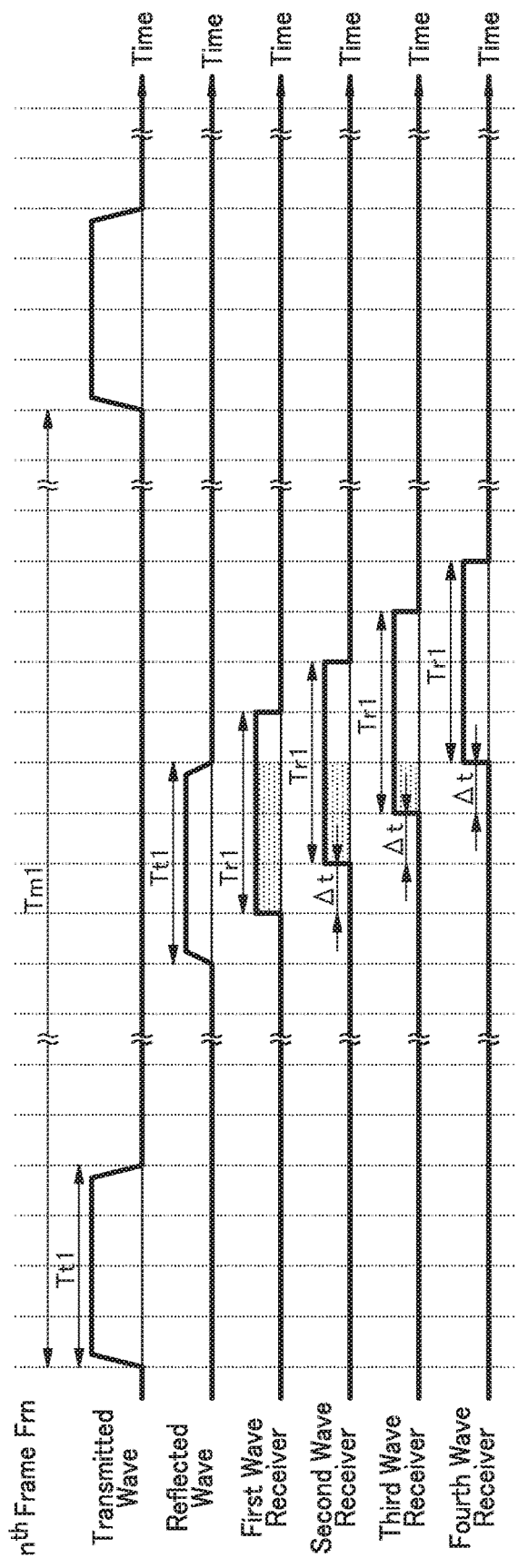
FIG. 5 is a timing diagram illustrating how a distance measuring device according to a first variation of the exemplary embodiment of the present disclosure operates.

In this variation, the distance calculating unit 12 calculates the distance to the target 4 based on at least one of a post-end-of-wave-reception period or a pre-end-of-wave-reception period (see FIG. 5). As used herein, the post-end-of-wave-reception period refers to the first wave reception period Tr1 that has begun at a beginning time later than the wave reception period Tr1 in which the measuring wave W1 has been received, out of the plurality of wave reception periods Tr1 of the measuring period Tm1. The pre-end-of-wave-reception period herein refers to the wave reception period Tr1 that has begun at a beginning time earlier by one unit than the beginning time of the post-end-of-wave-reception period, out of the plurality of wave reception periods Tr1 of the measuring period Tm1. In the example illustrated in FIG. 5, the wave reception period Tr1 of the fourth wave receiver 31D is the post-end-of-wave-reception period and the wave reception period Tr1 of the third wave receiver 31C is the pre-end-of-wave-reception period.

As shown in FIG. 5, the measuring wave W1 reflected from the target 4 (reflected wave) should have been received by the wave reception module 3 through the time interval between the beginning of the pre-end-of-wave-reception period (i.e., the wave reception period Tr1 of the third wave receiver 31C) and the beginning of the post-end-of-wave-reception period (i.e., the wave reception period Tr1 of the fourth wave receiver 31D). This allows the distance to the target 4 to be calculated based on the time interval between the start of transmission of the measuring wave W1 from the wave transmission module 2 (i.e., the beginning of the measuring period Tm1) and the end of either the post-end-of-wave-reception period or the pre-end-of-wave-reception period.

The distance calculating unit 12 determines, by the pixel value corresponding to each wave receiver 31, at least one of the post-end-of-wave-reception period or the pre-end-of-wave-reception period. Specifically, the distance calculating unit 12 sequentially generates pixel values by beginning with the pixel signal of the first wave receiver 31A. Then, the distance calculating unit 12 determines the wave reception period Tr1 of the wave receiver 31 (e.g., the fourth wave receiver 31D in FIG. 5) corresponding to the pixel signal, of which the pixel value has just changed from one to zero to be the post-end-of-wave-reception period. In addition, the distance calculating unit 12 determines the wave reception period Tr1 of the wave receiver 31 (e.g., the third wave receiver 31C in FIG. 5) corresponding to the pixel signal, of which the pixel value is on the verge of changing from one to zero to be the pre-end-of-wave-reception period. The distance calculating unit 12 calculates, based on the frame Fr corresponding to the pixel signal and the post-end-of-wave-reception period or pre-end-of-wave-reception period determined, the time interval between the start of transmission of the measuring wave W1 from the wave transmission module 2 and the end of either the post-end-of-wave-reception period or the pre-end-of-wave-reception period. Then, the distance calculating unit 12 calculates the distance to the target 4 based on the time interval thus calculated.

Thus, this variation allows the distance to the target 4 to be calculated by a unit distance $\Delta l$ ($=\Delta t \times c/2$ (where c is the velocity of light)) based on the time lag $\Delta t$ between the wave reception periods Tr1. For example, if the time lag $\Delta t$ is 25 ns, then the unit distance $\Delta l$ is 3.75 m, thus increasing the resolution of the distance measured, compared to a situation where the wave reception periods Tr1 are shifted from each other so as not to overlap with each other.

(4.2) Second Variation

In this variation, the distance calculating unit 12 calculates the distance to the target 4 based on a series of wave reception periods Tr1 from a post-start-of-wave-reception period through a pre-end-of-wave-reception period, out of the plurality of wave reception periods Tr1. As used herein, the post-start-of-wave-reception period refers to a wave reception period Tr1 in which the measuring wave W1 has been received for the first time, out of the plurality of wave reception periods Tr1 The pre-end-of-wave-reception period herein refers to a wave reception period Tr1 in which the measuring wave W1 has been received for the last time, out of the plurality of wave reception periods Tr1. In the example illustrated in FIG. 4, the wave reception period Tr1 of the second wave receiver 31B in the first frame Fr1 is the post-start-of-wave-reception period and the wave reception period Tr1 of the fourth wave receiver 31D in the second frame Fr2 is the pre-end-of-wave-reception period.

As shown in FIG. 4, the measuring wave W1 reflected from the target 4 (reflected wave) should be received by the wave reception module 3 during the time interval between the beginning time of the post-start-of-wave-reception period and the end time of the pre-end-of-wave-reception period. That is to say, in a series of seven wave reception periods Tr1 (hereinafter referred to as "series of wave reception periods Tr1") from the post-start-of-wave-reception period of the second wave receiver 31B in the first frame Fr1 through the pre-end-of-wave-reception period of the fourth wave receiver 31D in the second frame Fr2, the measuring wave W1 reflected from the target 4 is received. As used herein, the "series of" wave reception periods Tr1 means that the respective beginning times of the wave reception periods Tr1 are sequential in order. In addition, even if the series of wave reception periods Tr1 belong to multiple different frames Fr, those wave reception periods Tr1 may still form a series of wave reception periods Tr1. For example, in the sequential order of the respective beginning times of the wave reception periods Tr1, the wave reception period Tr1 of the fourth wave receiver 31D in the first frame Fr1 is followed by the wave reception period Tr1 of the first wave receiver 31A in the second frame Fr2.

The measuring wave W1 reflected from the target 4 (reflected wave) should have arrived at the wave reception module 3 at substantially the same timing as the beginning time of the fourth wave reception period Tr1 (namely, the wave reception period Tr1 of the first wave receiver 31A in the second frame Fr2) out of the series of seven wave reception periods Tr1. Thus, this allows the distance to the target 4 to be calculated based on the time interval between the start of transmission of the measuring wave W1 from the wave transmission module 2 (i.e., the beginning of the measuring period Tm1) and the beginning of the fourth wave reception period Tr1 (i.e., the wave reception period Tr1 of the first wave receiver 31A in the second frame Fr2).

The number of the series of wave reception periods Tr1 is determined by the relationship between the time length of the wave transmission periods Tt1 and the wave reception periods Tr1 and the time lag $\Delta t$ between the plurality of wave reception periods Tr1. According to the present disclosure, the time length of the wave transmission periods Tt1 and the wave reception periods Tr1 is four times as long as the time lag Δt, and therefore, the number of the series of wave reception periods Tr1 becomes seven or eight.

Note that if the number of the series of wave reception periods Tr1 is eight, then the measuring wave W1 reflected from the target 4 (reflected wave) should have arrived at the wave reception module 3 during the interval between the beginning time of the fourth wave reception period Tr1 and the fifth wave reception period Tr1.

The distance calculating unit 12 determines, by the pixel value corresponding to each wave receiver 31 on a frame Fr basis, the series of wave reception periods Tr1. Specifically, the distance calculating unit 12 sequentially generates pixel values by beginning with the pixel signal of the first wave receiver 31A on a frame Fr basis. Then, the distance calculating unit 12 determines the wave reception period Tr1 of the wave receiver 31 (e.g., the second wave receiver 31B in the first frame Fr1 in FIG. 4) corresponding to the pixel signal, of which the pixel value has just changed from zero to one, to be the post-start-of-wave-reception period. In addition, the distance calculating unit 12 determines the wave reception period Tr1 of the wave receiver 31 (e.g., the fourth wave receiver 31D in the second frame Fr2 in FIG. 4) corresponding to the pixel signal, of which the pixel value is on the verge of changing from one to zero, to be the pre-end-of-wave-reception period. That is to say, the distance calculating unit 12 determines the wave reception periods Tr1 of the wave receivers 31 corresponding to the pixel signals, of which the pixel values continue to be one (i.e., from the second wave receiver 31B in the first frame Fr1 through the fourth wave receiver 31 D in the second frame Fr2 in FIG. 4) to be the series of wave reception periods Tr1.

When finding the number of the series of wave reception periods Tr1 equal to or greater than a predetermined value (seven in this example), the distance calculating unit 12 calculates the distance to the target 4. Specifically, the distance calculating unit 12 locates the fourth wave reception period Tr1 (e.g., the wave reception period Tr1 of the first wave receiver 31A in the second frame Fr2 in FIG. 4) that is middle in sequential order in the series of seven wave reception periods Tr1. Then, the distance calculating unit 12 calculates, based on the frame Fr including the fourth wave reception period Tr1, the time interval between start of transmission of the measuring wave W1 and the beginning of the fourth wave reception period Tr1. Thereafter, the distance calculating unit 12 calculates the distance to the target 4 based on the time interval thus calculated. Alternatively, the distance calculating unit 12 may also calculate the distance to the target 4 based on the wave reception period Tr1 that is any one of the post-start-of-wave-reception period, the pre-start-of-wave-reception period, the post-end-of-wave-reception period, or the pre-end-of-wave-reception period as described above.

On the other hand, when finding the number of the series of wave reception periods Tr1 less than the predetermined value, the distance calculating unit 12 does not calculate the distance to the target 4.

In this variation, only when the pixel value "1" is continuous at least a predetermined number of times, the distance to the target 4 is calculated. Thus, even if the pixel value has changed temporarily due to noise, for example, the distance calculating unit 12 does not calculate the distance to the target 4, thus reducing erroneous detection of the target 4.

(4.3) Third Variation

A distance measuring device 10 according to a third variation will be described with reference to FIGS. 6 and 7. The distance measuring device 10 according to this variation is configured to make provisional measurement of the distance to the target 4 before making final measurement of the distance to the target 4. As used herein, the "final measurement" refers to calculating the distance to the target 4 by shifting the respective beginning times of the plurality of wave reception periods Tr1 by a time lag Δt shorter than each wave reception period Tr1 as described above. Also, as used herein, the "provisional measurement" refers to calculating the distance to the target 4 by shifting the respective beginning times of the plurality of wave reception period Tr2 such that the plurality of wave reception period Tr2 do not overlap with each other. The distance measuring device 10 according to this variation calculates an approximate distance to the target 4 through the provisional measurement and then calculates the distance to the target 4 more accurately through the final measurement having higher measurement resolution than the provisional measurement.

Figure 6:
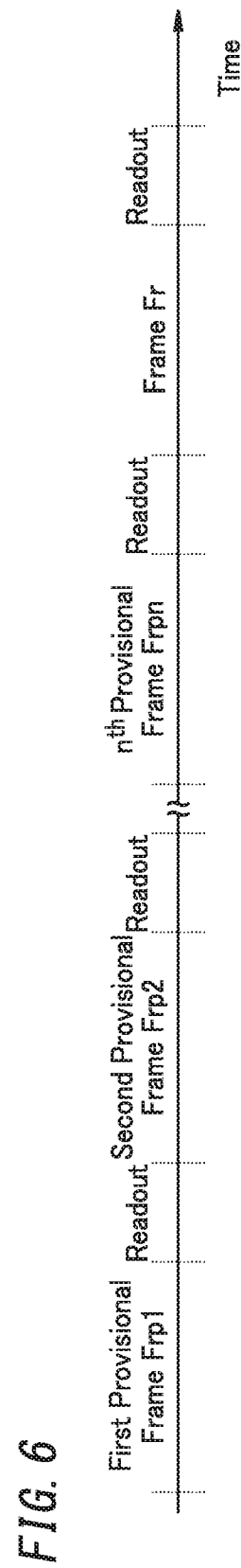
FIG. 6 illustrates operation according to a third variation of the exemplary embodiment of the present disclosure.

In the provisional measurement, provisional frames Frp in which the measuring wave W1 is transmitted intermittently alternate with readout periods in which the pixel signals are output (see FIG. 6). In the following description, when the plurality of provisional frames Frp need to be distinguished from each other, those provisional frames Frp will be hereinafter sequentially referred to as the first provisional frame Frp1, the second provisional frame Frp2, . . . and the $n^{th}$ provisional frame Frpn by beginning with the initial provisional frame Frp. Each provisional frame includes a plurality of provisional measuring periods Tm2. The wave transmission control unit 111 has the measuring wave W1 transmitted from the wave transmission module 2 at the beginning of each provisional measuring period Tm2.

The wave reception control unit 112 sequentially turns the plurality of wave receivers 31 (namely, the first through fourth wave receivers 31A-31D) exposed in each provisional measuring period Tm2. The wave reception control unit 112 shifts the respective beginning times of the plurality of wave reception period Tr2 from each other to prevent the plurality of wave reception periods Tr2 from overlapping with each other in each provisional measuring period Tm2. The time lag between the respective beginning times of the plurality of wave reception periods Tr2 in each provisional measuring period Tm2 is as long as the time length of the wave transmission periods Tt2 and wave reception periods Tr2 of the measuring wave W1 in each provisional measuring period Tm2.

Also, in the same provisional frame Frp, the time lag between the beginning time of the wave transmission period Tt2 of the measuring wave W1 and the beginning time of each wave reception period Tr2 remains the same throughout the respective provisional measuring periods Tm2. Meanwhile, the time lag between the beginning time of the wave transmission period Tt2 of the measuring wave W1 and the beginning time of each wave reception period Tr2 varies from one provisional frame Frp to another. This allows the measuring wave W1 reflected from the target 4 to be received, no matter at what distance the target 4 is located within the measurable range.

Figure 7:
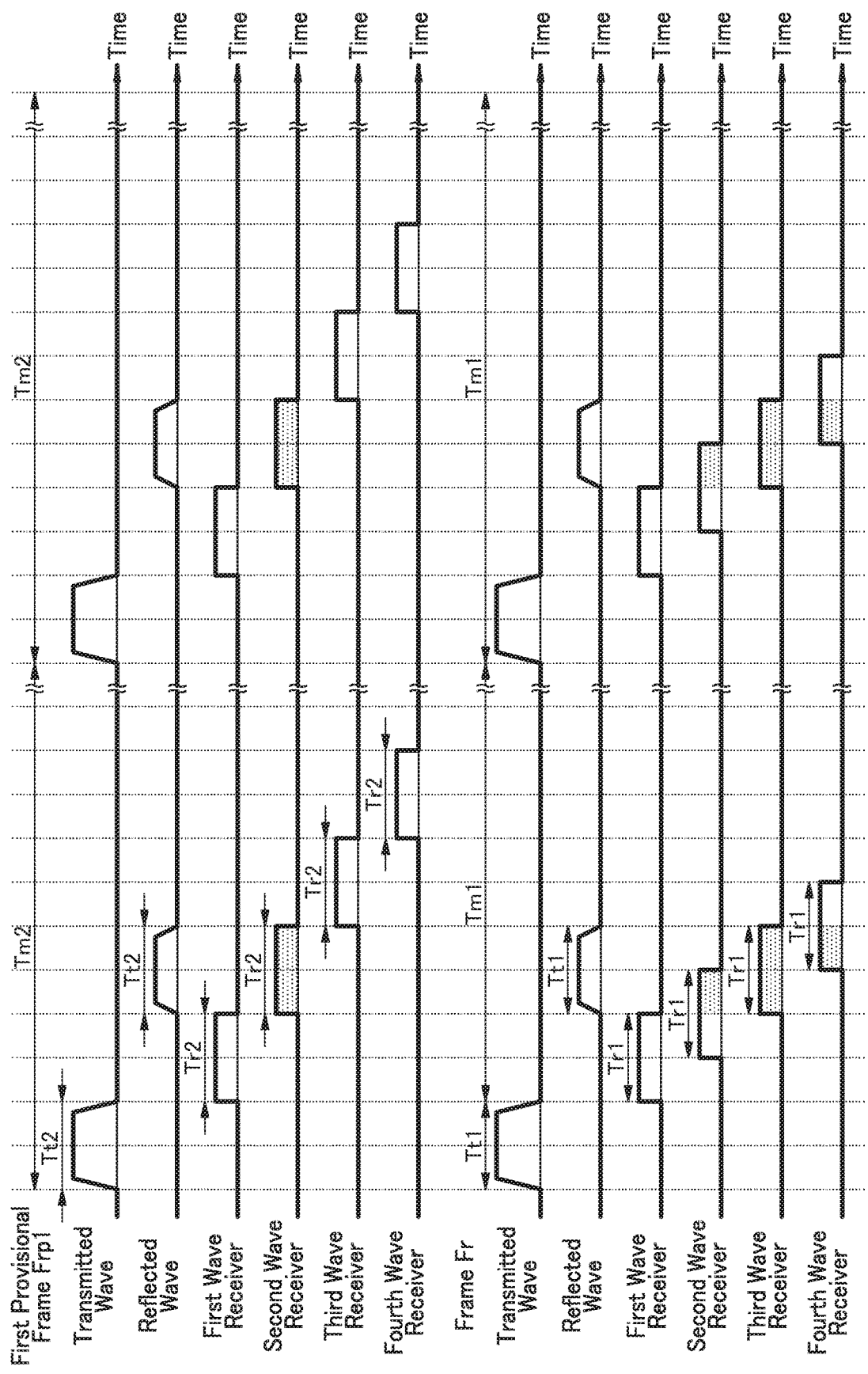
FIG. 7 is a timing diagram illustrating how the distance measuring device operates.

The distance calculating unit 12 determines, based on a plurality of pixel signals in a provisional frame Frp, the wave reception period Tr2 in which the measuring wave W1 reflected from the target 4 has been received (e.g., the wave reception period Tr2 of the second wave receiver 31B in the first provisional frame Frp1 in FIG. 7). Specifically, the distance calculating unit 12 determines a wave reception period Tr2 corresponding to a pixel signal with a pixel value "1" to be the wave reception period Tr2 in which the measuring wave W1 reflected from the target 4 has been received (hereinafter referred to as a "provisional wave reception period Tr2").

In the final measurement, after the readout period following the $n^{th}$ provisional frame Frpn in the provisional measurement, a frame Fr in which the measuring wave W1 is transmitted intermittently and a readout period in which pixel signals are output will arise (see FIG. 6). In the final measurement, the beginning times of the plurality of wave reception periods Tr1 are shifted from each other such that any one of the plurality of wave reception periods Tr1 overlaps with at least part of the provisional wave reception period Tr2 determined in the provisional measurement during each measuring period Tm1 of each frame Fr (see FIG. 7). In this variation, the time lag Δt between the respective beginning times of the plurality of wave reception periods Tr1 is one half as long as the time length of the wave transmission period Tt1 and the respective wave reception periods Tr1. In the example illustrated in FIG. 7, the respective wave reception periods Tr1 of the second to fourth wave receivers 31B-31D overlap with the provisional wave reception periods Tr2.

In this variation, the time lengths of the provisional measuring period Tm2, the wave transmission period Tt2, and the wave reception periods Tr2 during the provisional measurement are respectively as long as the time lengths of the measuring period Tm1, the wave transmission period Tt1, and the wave reception periods Tr1 during the final measurement. However, this is only an example of the present disclosure and should not be construed as limiting. Alternatively, the time lengths of the former group of periods may be different from those of the latter group of periods.

The distance calculating unit 12 determines at least one of the post-start-of-wave-reception period (e.g., the wave reception period Tr1 of the second wave receiver 31B in FIG. 7) or the pre-start-of-wave-reception period (e.g., the wave reception period Tr1 of the first wave receiver 31A in FIG. 7) out of the plurality of wave reception periods Tr1 of the measuring period Tm1 in each frame Fr. The distance calculating unit 12 calculates, based on either the post-start-of-wave-reception period or pre-start-of-wave-reception period thus determined, the time interval between the start of transmission of the measuring wave W1 from the wave transmission module 2 and the end of either the pre-start-of-wave-reception period or the post-start-of-wave-reception period. Then, the distance calculating unit 12 calculates, based on the time interval thus calculated, the distance to the target 4 as the result of the final measurement.

Alternatively, the distance calculating unit 12 may also calculate the distance to the target 4 based on either the post-end-of-wave-reception period or the pre-end-of-wave-reception period (e.g., the wave reception period Tr1 of the fourth wave receiver 31D in FIG. 7) as in the first variation described above.

Still alternatively, the distance calculating unit 12 may calculate the distance to the target 4 when the number of the series of wave reception periods Tr1 (e.g., the respective wave reception periods Tr1 of the second through fourth wave receivers 31B-31D in FIG. 7) is equal to or greater than a predetermined value (e.g., three in this example) as in the second variation described above. In that case, the distance calculating unit 12 calculates the time interval between the start of transmission of the measuring wave W1 from the wave transmission module 2 and the beginning of the wave reception period Tr1 at the middle in sequential order in the series of three wave reception periods Tr1 (e.g., the wave reception period Tr1 of the third wave receiver 31C in FIG. 7). Then, the distance calculating unit 12 calculates the distance to the target 4 based on the time interval thus calculated. Alternatively, the distance calculating unit 12 may also calculate the distance to the target 4 based on the wave reception period Tr1 that is any one of the post-start-of-wave-reception period, the pre-start-of-wave-reception period, the post-end-of-wave-reception period, or the pre-end-of-wave-reception period.

According to this variation, an approximate distance to the target 4 is calculated through the provisional measurement, and then the distance to the target 4 is calculated more accurately through the final measurement with higher measurement resolution than the provisional measurement. This allows the measurement to be done in a shorter time with the measurement precision improved. This variation is applicable particularly effectively to a situation where the measurable range is relatively long.

(4.4) Other Variations

Next, other variations of the distance measuring device 10 will be enumerated one after another.

The plurality of first through fourth pixels 311A-311D do not have to be arranged in the first direction and the second direction (see FIG. 2).

Figure 8:
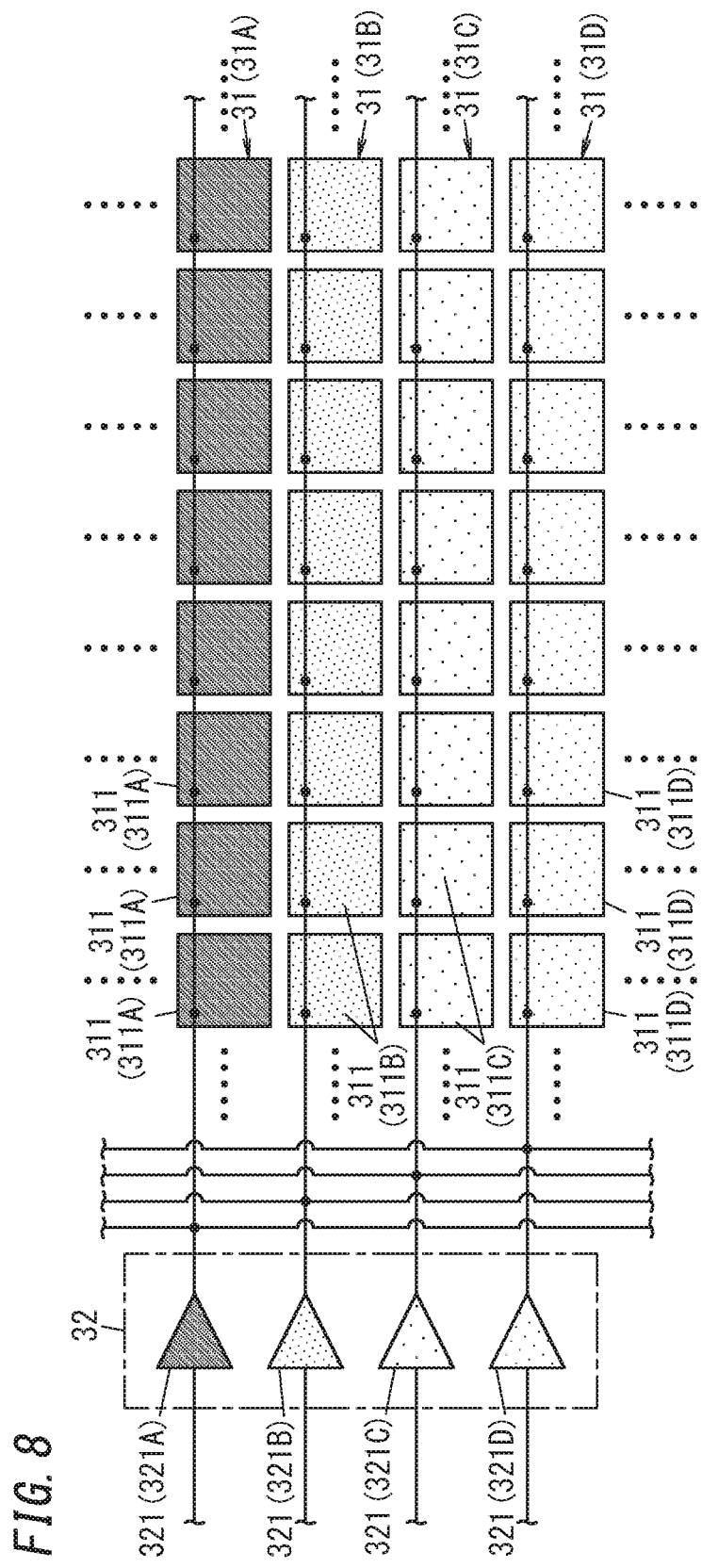
FIG. 8 schematically illustrates an arrangement of pixels in a distance measuring device according to another variation of the exemplary embodiment of the present disclosure.

Alternatively, as shown in FIG. 8, the plurality of wave receivers 31 (namely, the first through fourth wave receivers 31A-31D) may also be arranged in the first direction (e.g., vertically in FIG. 8). Each of the plurality of wave receivers 31 includes a plurality of pixels 311 (partial wave receivers) arranged in a second direction (e.g., horizontally in FIG. 8) perpendicular to the first direction. Specifically, the first wave receiver 31A includes a plurality of first pixels 311A arranged in the second direction. The second wave receiver 31B includes a plurality of second pixels 311B arranged in the second direction so as to be adjacent to the first wave receiver 31A on one side in the first direction (e.g., under the first wave receiver 31A in FIG. 8). The third wave receiver 31C includes a plurality of third pixels 311C arranged in the second direction so as to be adjacent to the second wave receiver 31B on one side in the first direction (e.g., under the second wave receiver 31B in FIG. 8). The fourth wave receiver 31D includes a plurality of fourth pixels 311D arranged in the second direction so as to be adjacent to the third wave receiver 31C on one side in the first direction (e.g., under the third wave receiver 31C in FIG. 8). Although not shown in FIG. 8, the first wave receiver 31A may be arranged adjacent to the fourth wave receiver 31D on one side in the first direction.

In this variation, the plurality of pixels 311 are arranged in the second direction in each wave receiver 31. This reduces, compared to arranging the plurality of pixels 311 in the first and second directions in each wave receiver 31 (see FIG. 2), the number of interconnection lines required to electrically connect the plurality of pixels 311 to the gate drivers 321, thus facilitating the layout of the interconnection lines.

In addition, the interconnection lines to electrically connect the plurality of pixels 311 to the gate drivers 321 are arranged on the photosensitive surface of the pixels 311. This reduces, compared to arranging the plurality of pixels 311 in the first and second directions in each wave receiver 31 (see FIG. 2), the area covered with the interconnection lines in each pixel 311, thus increasing the quantity of light received by each pixel 311. This allows the measurable range to be extended.

Furthermore, in the examples described above, the measuring wave W1 is supposed to be light. However, this is only an example of the present disclosure and should not be construed as limiting. Alternatively, the measuring wave W1 may also be an ultrasonic wave, a radio wave, or any other suitable wave.

Furthermore, in the examples described above, the time lag Δt between the respective beginning times of the plurality of wave reception periods Tr1 has a time length obtained by dividing the time length of the wave transmission period Tt1 and the wave reception periods Tr1 by two or four. Alternatively, the time lag Δt may also have a time length obtained by dividing the time length of the wave transmission period Tt1 and the wave reception periods Tr1 by three, or five or more.

Furthermore, in the examples described above, the number of the wave receivers 31 is as many as the number of the wave reception periods Tr1 in each measuring period Tm1. However, this is only an example of the present disclosure and should not be construed as limiting. Alternatively, the former number may be different from the latter number. Furthermore, the number of the wave receivers 31 provided does not have to be four but just needs to be two or more. The two or more wave receivers 31 include a first wave receiver and a second wave receiver. Note that the "first wave receiver" and "second wave receiver" are just labels used to distinguish the two wave receivers 31 from each other and their functions are not different. Therefore, when the number of wave receivers 31 that the wave reception module 3 includes is two, any one of the two wave receivers 31 is the first wave receiver and the other is the second wave receiver. On the other hand, when the number of wave receivers 31 that the wave reception module 3 includes is three or more, any one of the three or more wave receivers 31 is the first wave receiver and another wave receiver, different from the first wave receiver, is the second wave receiver.

In that case, in the distance measuring device 10, a first wave reception period in which the first wave receiver receives the measuring wave W1 and a second wave reception period in which the second wave receiver receives the measuring wave W1 may be different from each other on the time axis, and the respective beginning times of the first and second wave reception periods may be shifted from each other by a time lag shorter than either the first wave reception period or the second wave reception period.

(5) Resume

A distance measuring device (10) according to a first aspect is to be connected to a wave transmission module (2) to transmit a measuring wave (W1) and a wave reception module (3) including a first wave receiver and a second wave receiver, both of which receive the measuring wave (W1) that has been reflected from a target (4). In this distance measuring device (10), a first wave reception period in which the first wave receiver receives the measuring wave (W1) and a second wave reception period in which the second wave receiver receives the measuring wave (W1) overlap with each other on a time axis. In addition, in this distance measuring device (10), a time lag is provided between a beginning time of the first wave reception period and a beginning time of the second wave reception period. The time lag is shorter than either the first wave reception period or the second wave reception period.

According to this aspect, the respective beginning times of the first and second wave reception periods are shifted from each other, thus allowing the timing when the measuring wave (W1) reflected from the target (4) has arrived at the wave reception module (3) to be detected within the time lag between the respective beginning times of the first and second wave reception periods. The time lag between the respective beginning times of the first and second wave reception periods is shorter than the first wave reception period or the second wave reception period. This allows the distance measuring device (10) to measure the distance with higher resolution.

In a distance measuring device (10) according to a second aspect, which may be implemented in conjunction with the first aspect, the measuring wave (W1) is light.

This aspect reduces measurement errors to be caused by the surrounding environment.

A distance measuring device (10) according to a third aspect, which may be implemented in conjunction with the first or second aspect, further includes a distance calculating unit (12) to calculate a distance to the target (4) based on a result of wave reception by the first wave receiver and a result of wave reception by the second wave receiver.

In this aspect, the first wave receiver and the second wave receiver are included in a plurality of wave receivers (31). In other words, a distance measuring device (10) according to the third aspect, which may be implemented in conjunction with the first or second aspect, further includes a distance calculating unit (12) to calculate a distance to the target (4) based on multiple results of wave reception by the plurality of wave receivers (31).

This aspect allows the distance to the target (4) to be calculated.

In a distance measuring device (10) according to a fourth aspect, which may be implemented in conjunction with the third aspect, the distance calculating unit (12) calculates the distance to the target (4) based on at least one of a post-start-of-wave-reception period or a pre-start-of-wave-reception period, out of the first wave reception period and the second wave reception period. The post-start-of-wave-reception period is either the first wave reception period or the second wave reception period in which the measuring wave (W1) has been received for the first time. The pre-start-of-wave-reception period is a wave reception period (Tr1) which is either the first wave reception period or the second wave reception period that has begun at a beginning time earlier by one unit than a beginning time of the post-start-of-wave-reception period.

In this aspect, the first wave reception period and the second wave reception period are included in a plurality of wave reception periods (Tr1) of a measuring period (Tm1). In other words, in a distance measuring device (10) according to the fourth aspect, which may be implemented in conjunction with the third aspect, the distance calculating unit (12) calculates the distance to the target (4) based on at least one of a post-start-of-wave-reception period or a pre-start-of-wave-reception period, out of the plurality of wave reception periods (Tr1) of the measuring period (Tm1). The post-start-of-wave-reception period is one of the plurality of wave reception periods (Tr1) of the measuring period (Tm1) in which the measuring wave (W1) has been received for the first time. The pre-start-of-wave-reception period is one of the plurality of wave reception periods (Tr1) of the measuring period (Tm1) which has begun at a beginning time earlier by one unit than a beginning time of the post-start-of-wave-reception period.

This aspect contributes to increasing the resolution of the distance measured.

In a distance measuring device (10) according to a fifth aspect, which may be implemented in conjunction with the third aspect, the distance calculating unit (12) calculates the distance to the target (4) based on at least one of a post-end-of-wave-reception period or a pre-end-of-wave-reception period, out of the first wave reception period and the second wave reception period. The post-end-of-wave-reception period is a wave reception period (Tr1) which is either the first wave reception period or the second wave reception period that has begun for the first time at a beginning time later than a wave reception period (Tr1) in which the measuring wave (W1) has been received. The pre-end-of-wave-reception period is a wave reception period (Tr1) which is either the first wave reception period or the second wave reception period that has begun at a beginning time earlier by one unit than a beginning time of the post-end-of-wave-reception period.

In this aspect, the first wave reception period and the second wave reception period are included in a plurality of wave reception periods (Tr1) of a measuring period (Tm1). In other words, in a distance measuring device (10) according to the fifth aspect, which may be implemented in conjunction with the third aspect, the distance calculating unit (12) calculates the distance to the target (4) based on at least one of a post-end-of-wave-reception period or a pre-end-of-wave-reception period out of the plurality of wave reception periods (Tr1) of the measuring period (Tm1). The post-end-of-wave-reception period is one of the plurality of wave reception periods (Tr1) of the measuring period (Tm1) that has begun for the first time at a beginning time later than a wave reception period (Tr1) in which the measuring wave (W1) has been received. The pre-end-of-wave-reception period is one of the plurality of wave reception periods (Tr1) of the measuring period (Tm1) that has begun at a beginning time earlier by one unit than a beginning time of the post-end-of-wave-reception period.

This aspect contributes to increasing the resolution of the distance measured.

In a distance measuring device (10) according to a sixth aspect, which may be implemented in conjunction with the third aspect, the distance calculating unit (12) calculates the distance to the target (4) based on a series of wave reception periods (Tr1) from a post-start-of-wave-reception period through a pre-end-of-wave-reception period, out of the first wave reception period and the second wave reception period. The post-start-of-wave-reception period is either the first wave reception period or the second wave reception period in which the measuring wave (W1) has been received for the first time. The pre-end-of-wave-reception period is either the first wave reception period or the second wave reception period in which the measuring wave (W1) has been received for the last time.

In this aspect, the first wave reception period and the second wave reception period are included in a plurality of wave reception periods (Tr1) of a measuring period (Tm1). In other words, in a distance measuring device (10) according to the sixth aspect, which may be implemented in conjunction with the third aspect, the distance calculating unit (12) calculates the distance to the target (4) based on a series of wave reception periods (Tr1) from a post-start-of-wave-reception period through a pre-end-of-wave-reception period, out of the plurality of wave reception periods (Tr1). The post-start-of-wave-reception period is one of the plurality of wave reception periods (Tr1) in which the measuring wave (W1) has been received for the first time. The pre-end-of-wave-reception period is one of the plurality of wave reception periods (Tr1) in which the measuring wave (W1) has been received for the last time.

This aspect reduces erroneous detection of the target (4) due to noise, for example.

In a distance measuring device (10) according to a seventh aspect, which may be implemented in conjunction with any one of the first to sixth aspects, each of the first wave receiver and the second wave receiver includes a plurality of partial wave receivers (pixels 311) arranged in a first direction and a second direction perpendicular to the first direction. Two of the plurality of partial wave receivers (311), which are adjacent to each other in the first direction, belong to mutually different wave receivers (31). Two of the plurality of partial wave receivers (311), which are adjacent to each other in the second direction, belong to mutually different wave receivers (31).

In other words, in a distance measuring device (10) according to the seventh aspect, which may be implemented in conjunction with any one of the first to sixth aspects, each of the plurality of wave receivers (31) includes a plurality of partial wave receivers (pixels 311) arranged uniformly in a first direction and a second direction perpendicular to the first direction. Each of the plurality of partial wave receivers (311) is arranged such that the wave receiver (31) to which the partial wave receiver (311) belongs is different from the wave receivers (31) to which the partial wave receivers (311) adjacent to the former partial wave receiver (311) in the first direction and the second direction belong.

This aspect allows the target (4) in any of various shapes to be detect more accurately.

In a distance measuring device (10) according to an eighth aspect, which may be implemented in conjunction with any one of the first to sixth aspects, the first wave receiver and the second wave receiver are arranged in a first direction. Each of the first wave receiver and the second wave receiver includes a plurality of partial wave receivers (pixels 311) arranged in a second direction perpendicular to the first direction.

In other words, in a distance measuring device (10) according to the eighth aspect, which may be implemented in conjunction with any one of the first to sixth aspects, the plurality of wave receivers (31) are arranged in a first direction. Each of the plurality of wave receivers (31) includes a plurality of partial wave receivers (pixels 311) arranged in a second direction perpendicular to the first direction.

This aspect facilitates layout of interconnection lines connected to the plurality of partial wave receivers (311).

A distance measuring device (10) according to a ninth aspect is to be connected to a wave transmission module (2) to transmit a measuring wave (W1) and a wave reception module (3) including a plurality of wave receivers (31) to receive the measuring wave (W1) that has been reflected from a target (4). In this distance measuring device (10), respective wave reception periods (Tr1) in which the plurality of wave receivers (31) receive the measuring wave (W1) overlap with each other on a time axis. A time lag is provided between respective beginning times of the plurality of wave reception periods (Tr1). The time lag is shorter than each of the plurality of wave reception periods (Tr1).

In other words, a distance measuring device (10) according to the ninth aspect is to be connected to a wave transmission module (2) to transmit a measuring wave (W1) intermittently and a wave reception module (3) including a plurality of wave receivers (31) to receive the measuring wave (W1) that has been reflected from a target (4). The distance measuring device (10) includes a wave reception control unit (112). The wave reception control unit (112) controls the plurality of wave reception periods (Tr1) in which the plurality of wave receivers (31) receive the measuring wave (W1) on an individual basis with respect to each of the plurality of wave receivers (31). In a measuring period (Tm1) that is an interval between the start of transmission of the measuring wave (W1) from the wave transmission module (2) and the start of transmission of the next measuring wave (W1) from the wave transmission module (2), the wave reception control unit (112) shifts the respective beginning times of the plurality of wave reception periods (Tr1) by a time lag that is shorter than each of the plurality of wave reception periods (Tr1).

According to this aspect, the respective beginning times of the plurality of wave reception periods are shifted from each other. This allows the timing when the measuring wave (W1) reflected from the target (4) has arrived at the wave reception module (3) to be detected within the time lag between the respective beginning times of the plurality of wave reception periods. The time lag between the respective beginning times of the plurality of wave reception periods (Tr1) is shorter than each wave reception period (Tr1). This allows the distance measuring device (10) to increase the resolution of the distance measured.

In a distance measuring device (10) according to a tenth aspect, which may be implemented in conjunction with the ninth aspect, the plurality of wave receivers (31) is as many as the plurality of wave reception periods (Tr1).

This aspect facilitates individual control of the plurality of wave receivers.

A distance measuring system (1) according to an eleventh aspect includes: the distance measuring device (10) according to any one of the first to tenth aspects; the wave transmission module (2); and the wave reception module (3).

According to this aspect, the respective beginning times of the plurality of wave reception periods (Tr1) are shifted from each other. This allows the timing when the measuring wave (W1) reflected from the target (4) has arrived at the wave reception module (3) to be detected within the time lag between the respective beginning times of the plurality of wave reception periods (Tr1). The time lag between the respective beginning times of the plurality of wave reception periods (Tr1) is shorter than each wave reception period (Tr1). This allows the distance measuring system (1) to increase the resolution of the distance measured.

A distance measuring method according to a twelfth aspect is a method for measuring a distance to a target (4) based on a time interval between transmission of a measuring wave (W1) from a wave transmission module (2) and reception of the measuring wave (W1), reflected from the target (4), at a plurality of wave receivers (31) of a wave reception module (3). The distance measuring method includes controlling a plurality of wave reception periods (Tr1), in which the plurality of wave receivers (31) receive the measuring wave (W1), on an individual basis with respect to each of the plurality of wave receivers (31). The distance measuring method further includes shifting respective beginning times of the plurality of wave reception periods (Tr1) by a time lag which is shorter than each of the plurality of wave reception periods (Tr1).

In other words, a distance measuring method according to the twelfth aspect is a method for measuring a distance to a target (4) based on a time interval between intermittent transmission of a measuring wave (W1) from a wave transmission module (2) and reception of the measuring wave (W1), reflected from the target (4), at a plurality of wave receivers (31) of a wave reception module (3). The distance measuring method includes controlling a plurality of wave reception periods (Tr1), in which the plurality of wave receivers (31) receive the measuring wave (W1), on an individual basis with respect to each of the plurality of wave receivers (31). The distance measuring method further includes shifting respective beginning times of the plurality of wave reception periods (Tr1) by a time lag which is shorter than each of the plurality of wave reception periods (Tr1) in the measuring period (Tm1) that an interval between the end of transmission of the measuring wave (W1) from the wave transmission module (2) and the start of transmission of the next measuring wave (W1) from the wave transmission module (2).

According to this aspect, the respective beginning times of the plurality of wave reception periods (Tr1) are shifted from each other. This allows the timing when the measuring wave (W1) reflected from the target (4) has arrived at the wave reception module (3) to be detected within the time lag between the respective beginning times of the plurality of wave reception periods (Tr1). The time lag between the respective beginning times of the plurality of wave reception periods (Tr1) is shorter than each wave reception period (Tr1). This allows the distance measuring method to increase the resolution of the distance measured.

A program according to a thirteenth aspect is designed to cause a computer system (1) to execute the distance measuring method according to the twelfth aspect.

This aspect contributes to increasing the resolution of the distance measured.

REFERENCE SIGNS LIST

1 Distance Measuring System
10 Distance Measuring Device
112 Wave Reception Control Unit
12 Distance Calculating Unit
2 Wave Transmission Module
3 Wave Reception Module
31 Wave Receiver
311 Pixel (Partial Wave Receiver)
4 Target
W1 Measuring Wave
Tr1 Wave Reception Period
Tm Measuring Period

The invention claimed is:

1. A distance measuring device comprising a distance calculating unit configured to calculate a distance to a target, the distance measuring device being configured to receive, from a wave reception module including a first wave receiver and a second wave receiver, a result of wave reception by the first wave receiver and a result of wave reception by the second wave receiver, both of the first wave receiver and the second wave receiver being configured to receive the measuring wave that has been transmitted from a wave transmission module and reflected from the target, a first wave reception period in which the first wave receiver receives the measuring wave and a second wave reception period in which the second wave receiver receives the measuring wave overlapping with each other on a time axis, a time lag being provided between a beginning time of the first wave reception period and a beginning time of the second wave reception period, the time lag being shorter than either the first wave reception period or the second wave reception period, the distance calculating unit is configured to calculate the distance to the target based on:
- at least one of a post-start-of-wave-reception period or a pre-start-of-wave-reception period, the post-start-of-wave-reception period being either the first wave reception period or the second wave reception period in which the measuring wave has been received for the first time, the pre-start-of-wave-reception period being a wave reception period that has begun at a beginning time earlier by one unit than a beginning time of the post-start-of-wave-reception period;
- at least one of a post-end-of-wave-reception period or a pre-end-of-wave-reception period, the post-end-of-wave-reception period being either the first wave reception period or the second wave reception period that has begun for the first time at a beginning time later than a wave reception period in which the measuring wave has been received, the pre-end-of-wave-reception period being a wave reception period that has begun at a beginning time earlier by one unit than a beginning time of the post-end-of-wave-reception period; or
- a series of wave reception periods from the post-start-of-wave-reception period through the pre-end-of-wave-reception period.

2. The distance measuring device of claim 1, wherein the measuring wave is light.

3. The distance measuring device of claim 1, wherein
each of the first wave receiver and the second wave receiver includes a plurality of partial wave receivers arranged in a first direction and a second direction perpendicular to the first direction,
two of the plurality of partial wave receivers, which are adjacent to each other in the first direction, belong to mutually different wave receivers, and
two of the plurality of partial wave receivers, which are adjacent to each other in the second direction, belong to mutually different wave receivers.

4. The distance measuring device of claim 1, wherein
the first wave receiver and the second wave receiver are arranged in a first direction, and
each of the first wave receiver and the second wave receiver includes a plurality of partial wave receivers arranged in a second direction perpendicular to the first direction.

5. A distance measuring device comprising a distance calculating unit configured to calculate a distance to a target, the distance measuring device being configured to receive, from a wave reception module including a plurality of wave receivers configured to receive the measuring wave that has been transmitted from a wave transmission module and reflected from the target, results of wave reception by the plurality of wave receivers,
respective wave reception periods in which the plurality of wave receivers receive the measuring wave overlapping with each other on a time axis, a time lag being provided between respective beginning times of the plurality of wave reception periods, the time lag being shorter than each of the plurality of wave reception periods,
the distance calculating unit is configured to calculate the distance to the target based on:
- at least one of a post-start-of-wave-reception period or a pre-start-of-wave-reception period, the post-start-of-wave-reception period being out of the plurality of wave reception periods in which the measuring wave has been received for the first time, the pre-start-of-wave-reception period being a wave reception period that has begun at a beginning time earlier by one unit than a beginning time of the post-start-of-wave-reception period;
- at least one of a post-end-of-wave-reception period or a pre-end-of-wave-reception period, the post-end-of-wave-reception period being out of the plurality of wave reception periods that has begun for the first time at a beginning time later than a wave reception period in which the measuring wave has been received, the pre-end-of-wave-reception period being a wave reception period that has begun at a beginning time earlier by one unit than a beginning time of the post-end-of-wave-reception period; or
- a series of wave reception periods from the post-start-of-wave-reception period through the pre-end-of-wave-reception period.

6. The distance measuring device of claim 5, wherein the plurality of wave receivers is as many as the plurality of wave reception periods.

7. A distance measuring system comprising:
the distance measuring device of claim 1;
the wave transmission module; and
the wave reception module.

8. A distance measuring method comprising:
receiving, from a wave reception module including a plurality of wave receivers configured to receive the measuring wave that has been transmitted from a wave transmission module and reflected from a target, results of wave reception by the plurality of wave receivers,
respective wave reception periods in which the plurality of wave receivers receive the measuring wave overlapping with each other on a time axis, a time lag being provided between respective beginning times of the plurality of wave reception periods, the time lag being shorter than each of the plurality of wave reception periods,
the distance measuring method further comprising calculating the distance to the target based on:
- at least one of a post-start-of-wave-reception period or a pre-start-of-wave-reception period, the post-start-of-wave-reception period being out of the plurality of wave reception periods in which the measuring wave has been received for the first time, the pre-start-of-wave-reception period being a wave reception period that has begun at a beginning time earlier by one unit than a beginning time of the post-start-of-wave-reception period;
- at least one of a post-end-of-wave-reception period or a pre-end-of-wave-reception period, the post-end-of-wave-reception period being out of the plurality of wave reception periods that has begun for the first time at a beginning time later than a wave reception period in which the measuring wave has been received, the pre-end-of-wave-reception period being a wave reception period that has begun at a beginning time earlier by one unit than a beginning time of the post-end-of-wave-reception period; or
- a series of wave reception periods from the post-start-of-wave-reception period through the pre-end-of-wave-reception period.

9. A non-transitory computer-readable storage medium storing a computer program designed to cause a computer system to execute the distance measuring method of claim 8.

* * * * *